(12) United States Patent
Grote, Jr. et al.

(10) Patent No.: US 9,821,702 B2
(45) Date of Patent: *Nov. 21, 2017

(54) WARNING LIGHT ASSEMBLY

(71) Applicant: Whelen Engineering Company, Inc., Chester, CT (US)

(72) Inventors: William F. Grote, Jr., Deep River, CT (US); Jon H. Lyons, Haddam, CT (US)

(73) Assignee: Whelen Engineering Company, Inc., Chester, CT (US)

(*) Notice: Subject to any disclaimer, the term of this patent is extended or adjusted under 35 U.S.C. 154(b) by 340 days.

This patent is subject to a terminal disclaimer.

(21) Appl. No.: 14/600,286

(22) Filed: Jan. 20, 2015

(65) Prior Publication Data
US 2015/0130606 A1    May 14, 2015

Related U.S. Application Data

(63) Continuation of application No. 13/617,633, filed on Sep. 14, 2012, now Pat. No. 8,939,626.

(51) Int. Cl.
*B60Q 1/26* (2006.01)
*B60Q 1/00* (2006.01)

(52) U.S. Cl.
CPC .............. *B60Q 1/00* (2013.01); *B60Q 1/2611* (2013.01); *B60Q 1/2696* (2013.01)

(58) Field of Classification Search
CPC ............ B60C 1/00; B60C 1/26; B60C 1/2696
USPC ............................ 362/249.02, 540–545, 549
See application file for complete search history.

(56) References Cited

U.S. PATENT DOCUMENTS

| 6,863,424 | B2 | 3/2005 | Smith |
| 7,611,270 | B1 | 11/2009 | Lyons et al. |
| 7,854,531 | B1 | 12/2010 | Lyons |
| 2008/0232129 | A1 | 9/2008 | Lyons |
| 2010/0073948 | A1 | 3/2010 | Stein et al. |

*Primary Examiner* — Jason Moon Han
(74) *Attorney, Agent, or Firm* — Alix, Yale & Ristas, LLP

(57) ABSTRACT

A warning light for attachment to a vehicle comprising a thermally conductive longitudinally extending base, a plurality of light head mount assemblies, a plurality of LED warning light assemblies, and a plurality of electronic control circuits. Said base has a pair of generally parallel longitudinal edges and a pair of ribs projecting perpendicularly from said base. Said light head mount assemblies comprise a bracket and a light head retention shoe. Said bracket has a generally planar bracket first portion and a generally planar bracket second portion oriented perpendicular to said first portion. Said light head shoe has a sole configured to engage said bracket first portion, a rib engaging portion, and a brace extending angularly therebetween. Said LED assemblies are mounted on said bracket second portion. Said dome has a main body portion, sidewalls configured to engage said edges, and end walls.

18 Claims, 14 Drawing Sheets

WARNING LIGHT ASSEMBLY

BACKGROUND OF THE DISCLOSURE

The present disclosure relates to warning lights, and more particularly to warning light assemblies for use with a motor vehicle.

Warning lights in the form of light bars mounted on emergency vehicles are well known in the art. Warning lights are utilized on many different types of vehicles to give visual indications of their presence during emergencies. Warning lights typically comprise an elongated base, a plurality of electronic components, and at least one lens portion. The elongated base may be provided in the form of an extrusion.

Warning lights are traditionally required by state and federal safety regulations to produce very bright light with specific color and emission patterns. As a result, the electronic components and warning light assemblies give off a great deal of heat. Warning light assemblies, particularly those using light emitting diodes (LEDs), are able to put out less light and can be damaged when operated at higher temperatures.

When used on emergency motor vehicles, warning lights are exposed to a wide range of environmental conditions. As dirt, water, and salt may corrode metal parts, fog the lenses, and destroy electronic components, warning lights must provide a weather-resistant barrier against the elements.

The modern trend is toward compact, low profile, self-contained warning light assemblies. Given the well-known issues of heat generation and protection from the elements, modern light bars must simultaneously provide a strong weather-resistant seal while providing an efficient pathway for heat generated within. U.S. Pat. Nos. 7,611,270 and 6,863,424, assigned to the assignee of the present disclosure are illustrative of warning light assemblies utilizing two different configurations to seal the warning light against the elements and provide an efficient path to direct heat away from the electronic components.

SUMMARY

According to aspects of the disclosure, a warning light for attachment to a vehicle comprises a thermally conductive longitudinally extending base, a plurality of mounting assemblies, a plurality of warning light assemblies, and at least one light-transmissive dome secured to the base.

The base has a pair of generally parallel longitudinal edges configured to engage the base and defines a pair of longitudinally extending light head shoe retention pockets adjacent to and oriented away from the edges. A pair of longitudinally extending ribs are spaced laterally inwardly of the retention pockets and project generally perpendicular from the base. The ribs terminate in a ridge and have a light head shoe retention lip projecting laterally toward the retention pocket at a point intermediate the base and the ridge. The light head shoe retention lip defines a retention channel oriented towards the base.

The plurality of mounting light assemblies generally comprise a plurality of brackets and a corresponding plurality of light head retention shoes. Each of the brackets are constructed of thermally conductive material, and have a generally planar bracket first portion in contact with the base and a generally planar bracket second portion to support a light generator. The bracket first portion is oriented generally perpendicular to the bracket second portion. A plurality of LEDs are mounted in thermally conductive contact to the bracket second portion.

Each of the plurality of light head retention shoes has a sole having a leading edge and toes configured to engage the retention pocket of the base and to maintain the bracket first portion in thermally conductive contact with the base. A rib engaging portion is located laterally opposite the foot. The rib engaging portion has a plurality of fingers configured to engage the distal ridge and a flexible retention member configured to reversibly engage the retention channel. A brace having a web and opposed sidewalls extends angularly between the rib engaging portion and the sole. The sidewalls project generally perpendicularly from the web and form a rigid structure.

In accordance with a further aspect of the disclosure, the light-transmissive dome has a generally planar main body portion oriented generally parallel to the base and longitudinally opposed inner and outer ends. Longitudinally extending sidewalls are contiguous with and extend generally perpendicularly from the main body portion, and terminate in a bottom edge. The main body portion defines a shallow longitudinally extending dome channel sized to receive a longitudinally extending panel. The outer end has an end wall contiguous with and extending generally perpendicularly from the main body portion, and terminates in a bottom edge. The end wall is oriented contiguous with and generally transverse to the sidewalls. The parallel longitudinal edges define a longitudinally extending dome-securing channel configured to receive the bottom edge of the longitudinally extending sidewalls and define an interior cavity.

In accordance with a further aspect of the disclosure, the longitudinally extending ribs define a center channel sized to receive at least one PC board and a plurality of arch-shaped bridges. Each of the bridges has laterally opposed pairs of feet. A snap fit connector extends away from the bridge. The snap fit connector is configured to reversibly mate with notch defined on at least one of the ribs.

The bridge also has a PC board retention member which comprises a cantilevered snap fit connector. A PC board retention snap works cooperatively with a nub. The nub is configured to engage one of a plurality of locator holes defined on longitudinally opposed ends of the control PC board to secure the control PC board within the center channel.

The configuration of the warning light in the current disclosure reduces the part count and the number of tools required for assembly. Additionally, the modular design of the disclosure gives greater flexibility in the lay out of the warning light. The light heads may be located anywhere along the base, since there are no restrictions or fixed points where the hardware must be located to secure the light heads to the base.

BRIEF DESCRIPTION OF THE DRAWINGS

Aspects of the preferred embodiment will be described in reference to the Drawings, where like numerals reflect like elements.

DETAILED DESCRIPTION OF THE PREFERRED EMBODIMENT

Figure 1:
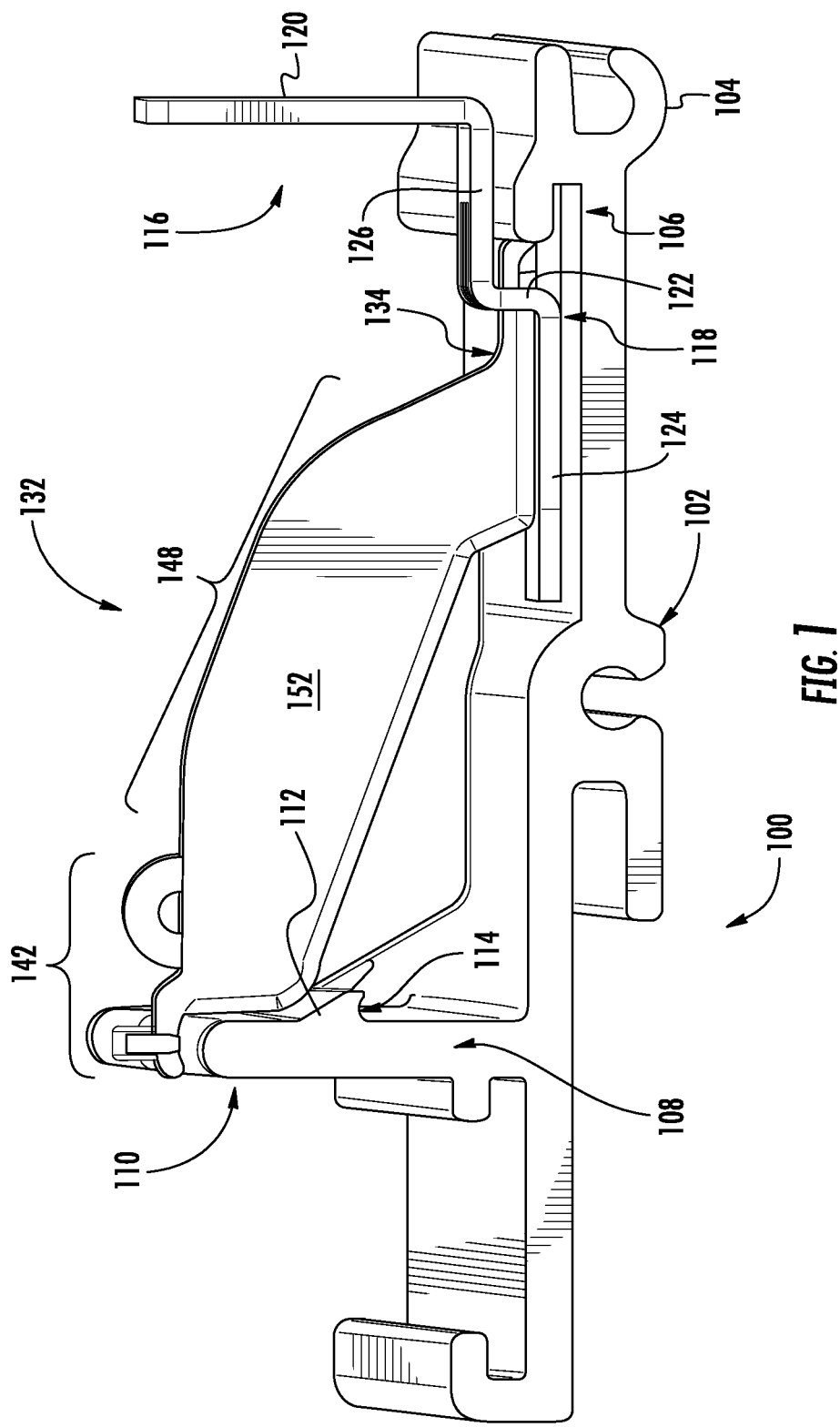
FIG. 1 is a side view of one embodiment of the warning light of the present disclosure, with particular emphasis on a light head shoe, a bracket, and the rib and retention pocket of the base, all other components of the warning light are omitted for clarity.
Figure 2:
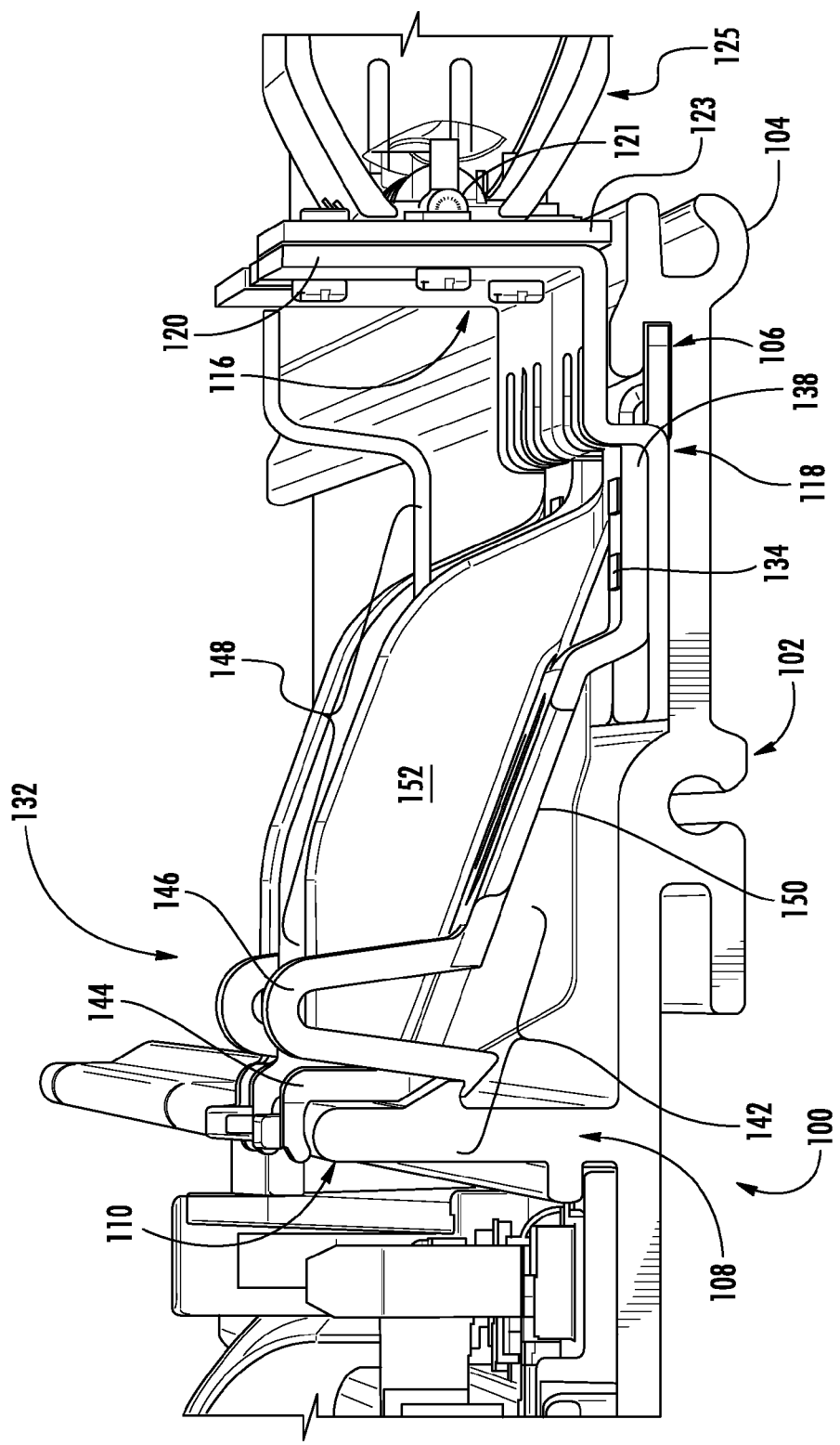
FIG. 2 is a perspective cross-sectional view of one embodiment of the warning light of the disclosure, the cross section is depicted as intersecting the warning light intermediate sidewalls of one of the light head shoes.

Embodiments of a warning light will now be described with reference to the Figures, wherein like numerals represent like parts throughout the FIGS. 1-8. FIGS. 1, 2 and 7 depict a warning light 100 for attachment to a vehicle comprises a longitudinally extending base 102 constructed from a thermally conductive material. In one embodiment, the base 102 is an aluminum extrusion.

The base 102 has a generally parallel pair of longitudinal edges 104. Laterally inwardly of the longitudinal edges 104, the base 102 defines a pair of light head retention pockets 106. The pocket 106 is defined along substantially the entire length of the base 102. The pockets 106 are defined on the base 102 such that the pocket opens generally away from the nearest longitudinal edge 104 toward the center of the base.

As seen in FIGS. 1, 2, 4 and 7, a pair of ribs 108 extends substantially the entire length of the base 102. The ribs 108 project from the base 102 intermediate the retention pockets 106, and run longitudinally parallel with the retention pockets 106 and the edges 104. The ribs 108 are equidistantly spaced from a central medial axis A-A (FIG. 4) and prevent warping under the aerodynamic forces that may act on the base by providing structural support.

As best seen in FIGS. 1, 2 and 7, the ribs 108 project perpendicularly from the base 102 and terminate in a distal ridge 110. In one embodiment, the ridge 110 is rounded and runs the length of the base 102. A retention lip 112 projects laterally toward the retention pocket 106. The retention lip 112 projects from the rib 108 at a point intermediate the base 102 and the ridge 110.

The retention lip 112 has a ramped cross section having an increasing width, as best seen in the embodiment depicted in FIGS. 1 and 2. The retention lip 112 defines a retention channel 114 oriented toward the base 102 and having a generally concave cross-section. The retention lip 112 projects along the entire length of the rib 108.

As best seen in FIGS. 1, 2, 3 and 5, the warning light also has a plurality of brackets 116 constructed from a thermally conductive material. Given its thermally conductive characteristics, superior workability and cost, in a preferred embodiment, the brackets 116 are constructed from sheets of aluminum. The brackets 116 have generally planar first and second portions 118 and 120, respectively. The bracket 116 is configured such that the bracket second portion 120 is oriented generally perpendicular to the bracket first portion 118.

As depicted in FIG. 2, a plurality of light emitting diodes (LEDs) 121 are mounted in thermally conductive contact to the bracket second portion 120. In the embodiment of the warning light 100 depicted in FIG. 2, the LEDs 121 are mounted to a PC board 123 and are operatively mounted within a reflector 125. Though a PC board 123 and reflector 125 are utilized in the embodiment shown, any of a multitude of configurations to mount the LEDs 121 to the bracket 116 may be utilized without departing from the scope of the disclosure.

Figure 5:
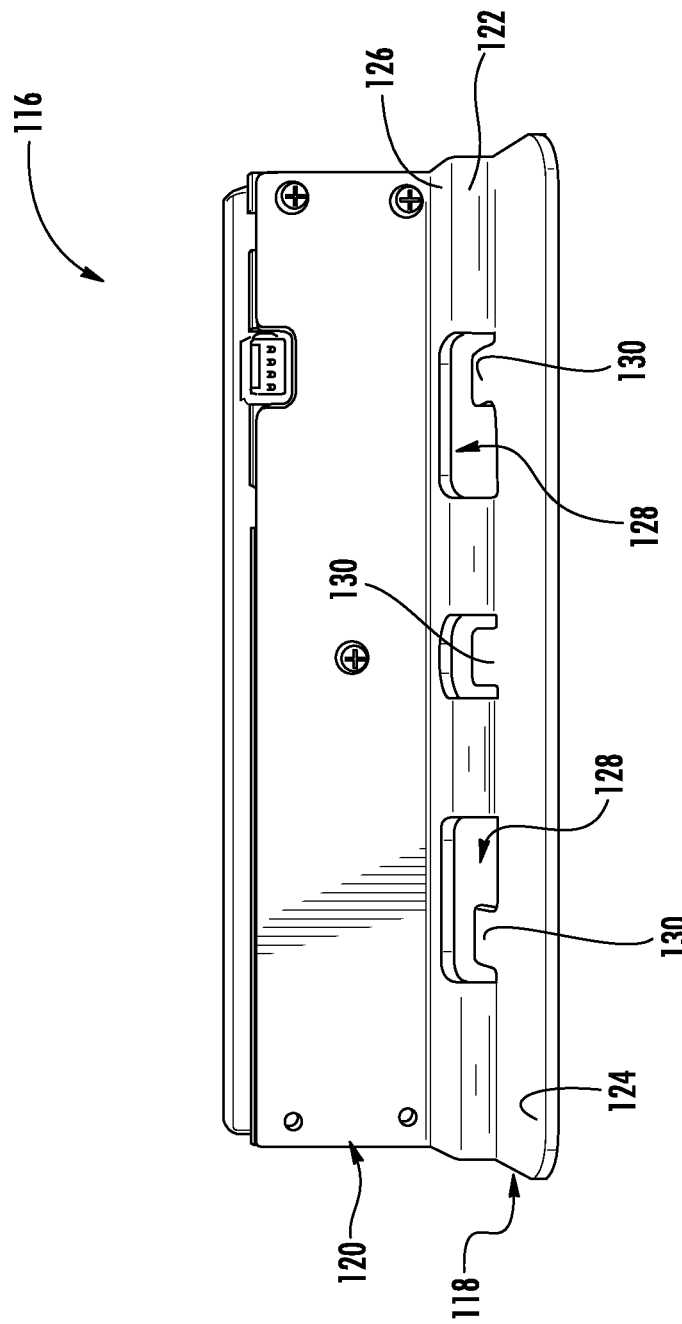
FIG. 5 shows a rear view of the embodiment of the bracket depicted in FIG. 2.

In one embodiment depicted in FIGS. 1, 2 and 5, the bracket first portion 118 has a stepped configuration. In this embodiment, a ledge 122 extends perpendicularly between first and second generally planar steps 124 and 126, respectively. The ledge 122 and first and second steps 124 and 126 define a plurality of engagement slots 128.

In one embodiment best seen in FIG. 5, the first step 124 has a plurality of laterally projecting retention pocket engaging extensions 130. The pocket engaging extensions 130 are constructed to engage the retention pocket 106 on the base 102 to ensure the brackets are secured against the base 102 in thermally conductive contact with the base 102.

A plurality of light head retention shoes 132 correspond in number with the brackets 116, and are best shown in FIGS. 1-4. The shoes 132 are configured to engage the brackets 116 to provide a secure connection between the brackets 116 and the base 102. In one embodiment, the shoes 132 are molded plastic components.

Each shoe 132 has a sole 134 a leading edge 138, and toes 140 configured to engage the bracket first portion 118. The sole 134 is oriented generally parallel to the base 102, and has a leading edge 138. In one embodiment (FIGS. 2 and 3), the sole 134 is generally planar. The planar configuration of the sole 134 is complementary to the bracket first portion 118 having a stepped configuration. The sole 134 is configured to maintain the first step 124 flat against the base 102. A plurality of toes 140 project from the sole 134 along the leading edge 138. The toes 140 are projections configured to engage the pocket 106 of the base 102. The plurality of engagement slots 128 defined by the ledge and first and second steps are sized to receive the toes 140 adjacent the extensions 130.

Figure 3:
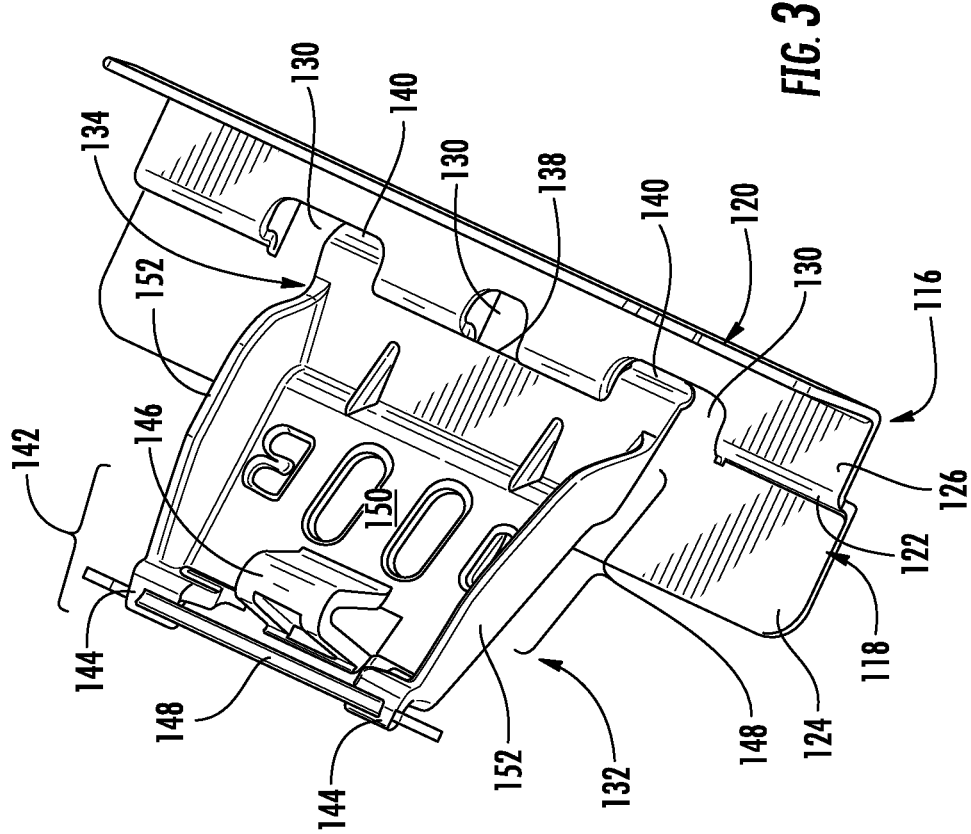
FIG. 3 is a perspective view of the embodiment of the light head retention shoe and the bracket of FIG. 2.

As seen in FIGS. 2 and 3, when the embodiment of the light head shoe 132 is correctly installed, the leading edge 138 abuts the bracket ledge 122. The toes 140 of the shoe 132 project through the slots and engage the retention pocket 106, while the leading edge 138 simultaneously provides a retentive force on the bracket first portion in a direction laterally toward the edge 104 of the base 102. In the embodiment of the bracket 116 having laterally projecting pocket engaging extensions, the retentive force provided by the leading edge 138 additionally causes the pocket engaging extensions 130 to engage the retention pocket 106. The leading edge thus acts in concert with the pocket engaging extensions 130 to provide an additional retentive force on the bracket 116 directed towards the base 102.

In an embodiment of the light head shoe 132 depicted in FIGS. 1-4, the light head shoes 132 also have a rib engaging portion 142. Specifically referring to FIGS. 1 and 2, the rib engaging portion 142 is configured laterally opposite the leading edge 138, and comprises a plurality of engagement fingers 144 and a flexible retention member 146. The engagement fingers 144 are designed to engage the ridge 110 of the ribs 108. The engagement fingers 144 are configured to complement the shape of ridge 110. For example, in the embodiment where the ridge 110 is rounded, the fingers have an arch-shaped cross section.

In the embodiment shown in FIG. 3, the flexible retention member 146 is disposed between the engagement fingers 144. The flexible retention member 146 is a cantilevered snap fit connector. While the resilient retention member 146 comprises a u-shaped cantilevered snap fit connector in the embodiment depicted in FIGS. 2 and 3, other shaped configurations of cantilevered snap fit connectors may be employed without departing form the scope of the disclosure.

Referring specifically to FIGS. 1, 2 and 3, a brace 148 extends angularly between the sole 134 and the rib engaging portion 142. The brace 148 has a web 150, and a pair of opposed sidewalls 152 projecting generally perpendicularly from the web 150 forming a rigid structure. In one embodiment, the sidewalls 152 are oriented parallel to one another, and extend angularly between the sole 134 and the rib engaging portion 142. As shown in FIG. 1, the engagement fingers 144 extend from the sidewalls 152.

In addition to holding the brackets 116 against the base 102, the shoes 132 also frictionally secure the brackets 116 longitudinally along the base 102 adjacent the edge 104. To install the shoe 132 and bracket 116, the bracket first portion 118 is first laid flat against the base 102 adjacent the edge 104. The pocket engaging extensions 130 are installed in the pocket 106 and the toes 140 are inserted into the engagement slots 128 adjacent the pocket engaging extensions 130. The toes 140 are inserted into the pocket 106, and the leading edge 138 exerts a force on the bracket laterally toward the edge 104. The shoe 132 is pivoted downwardly so that the engagement fingers 144 engage the ridge 110, and the flexible retention member 146 snaps into the retention channel 114.

A multitude of lighting configurations are possible as a result of the structural configuration of the base 102, the brackets 116 and the shoes 132. Since there are no fixed areas where hardware must be located to secure light heads to the base, different light patterns may be achieved using the same mounting apparatus and without perforating the base 102 for multiple mounting hardware configurations. Different LEDs and optical elements may also be used to change the pattern of the light emitted without changing the brackets 116 or the shoes 132.

Figure 4:
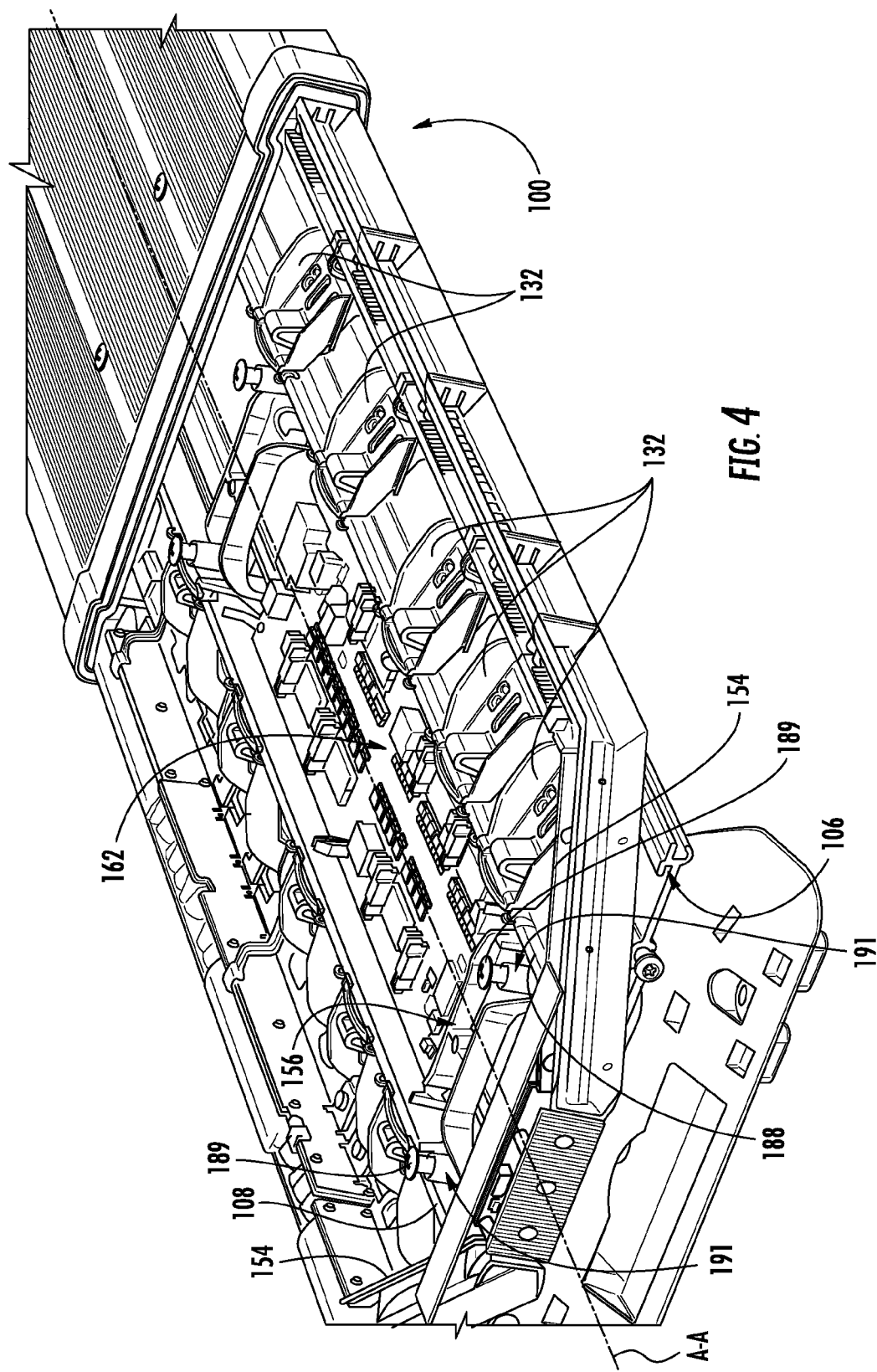
FIG. 4 shows a perspective view of one embodiment of the warning light; the generally concave light transmissive dome for a portion of the warning light is omitted for clarity, a mount to attach the warning light to a vehicle is also depicted.
Figure 6:
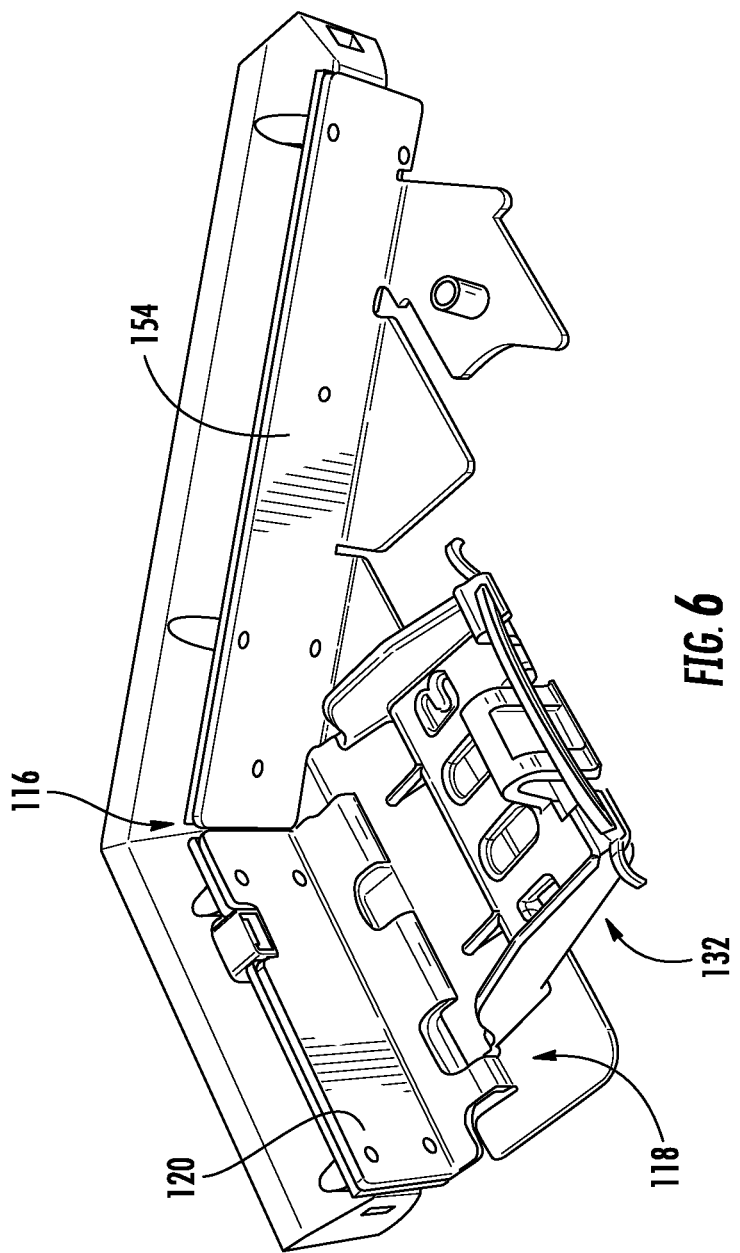
FIG. 6 shows an embodiment of the bracket configured for use with shoes disposed at longitudinal ends of the base.
Figure 7:
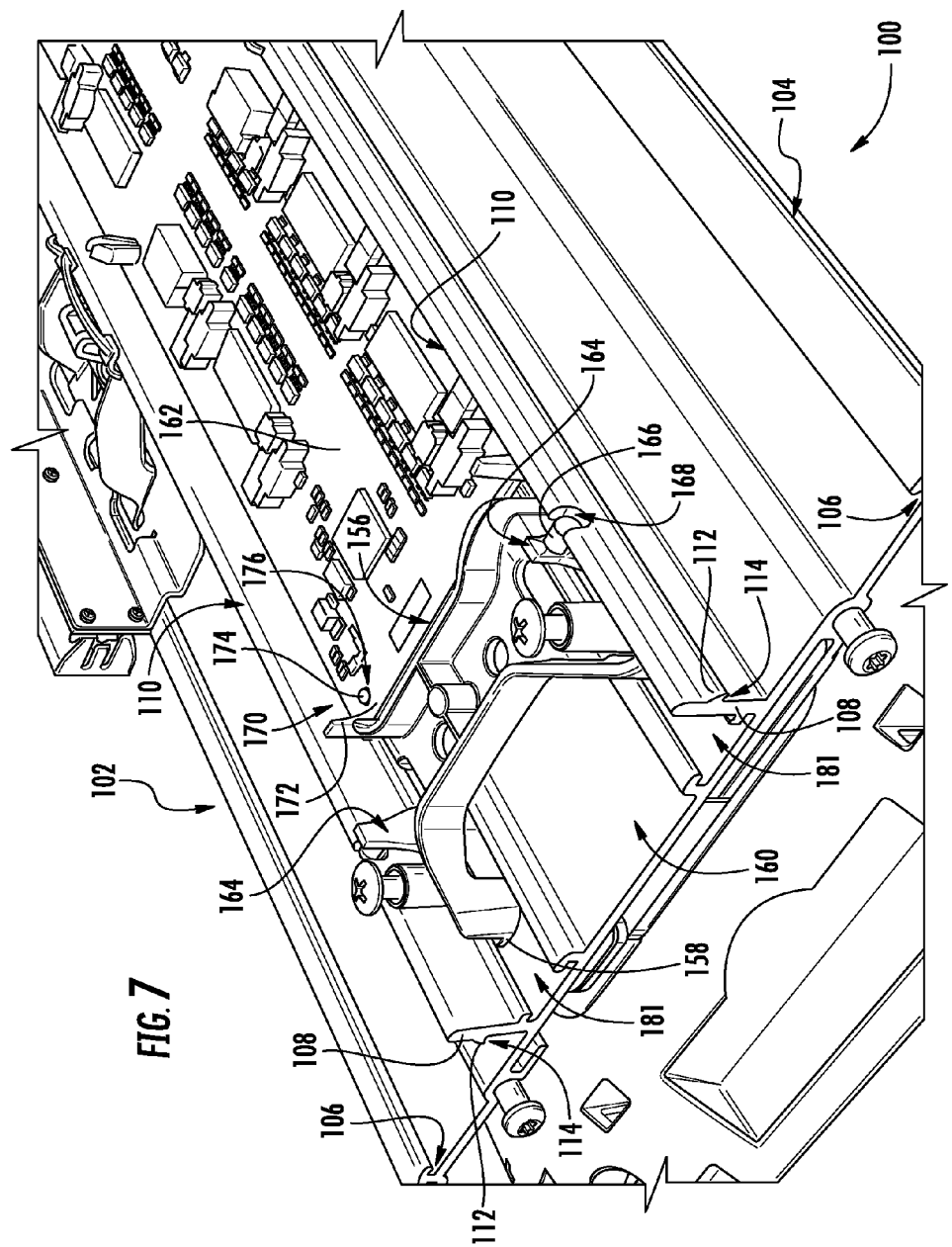
FIG. 7 is a perspective view of one embodiment of the base having a bridge received in a center channel defined intermediate the ribs, the warning light mount of FIG. 4 is also included.
Figure 9:
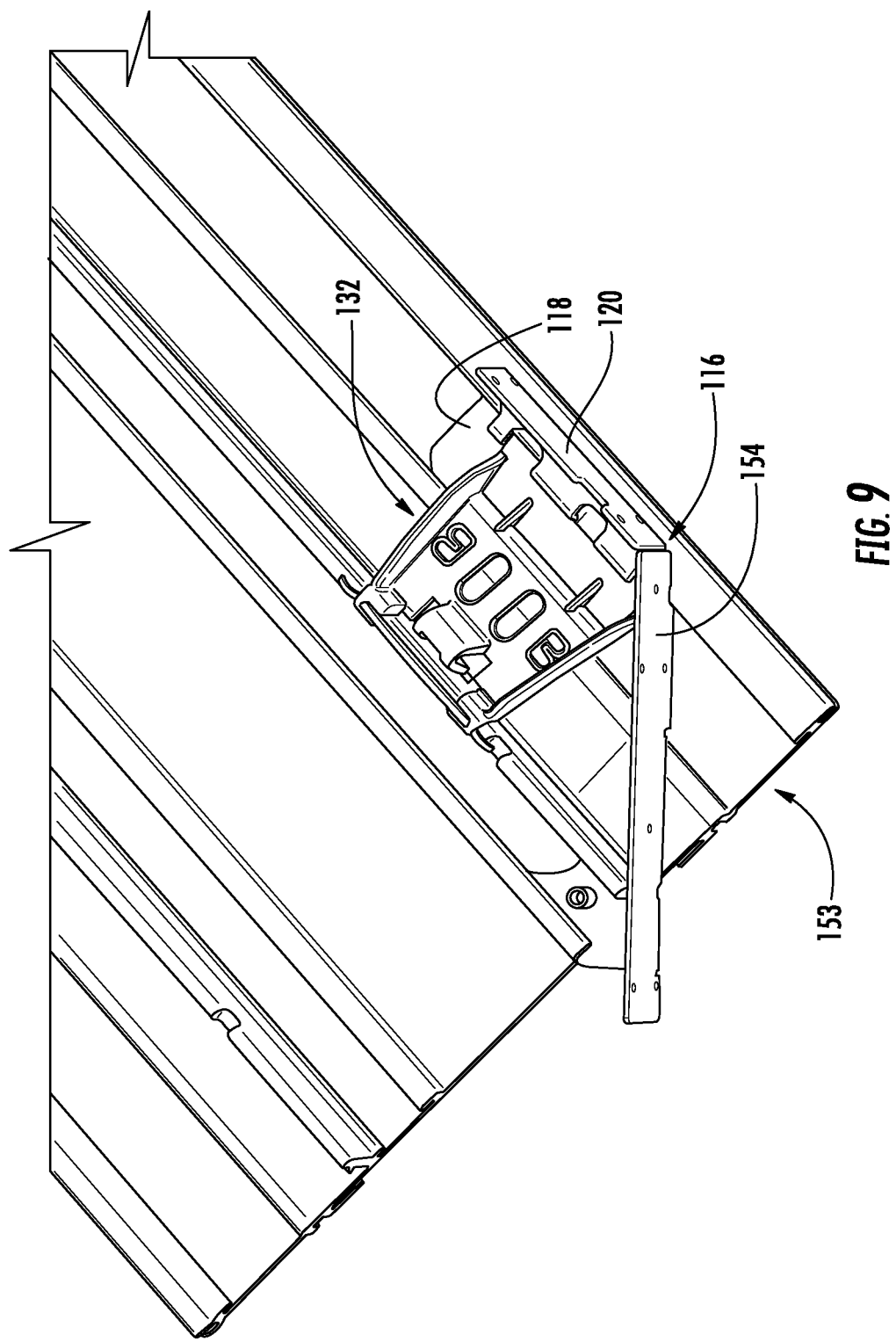
FIG. 9 shows a top plan view of the longitudinal ends of the base and the embodiment of the bracket depicted in FIG. 6 interfacing with a longitudinal end of the base, all other components of the warning light are omitted for clarity.

FIGS. 4, 6 and 9 show one embodiment of the bracket 116 specifically configured for use with light head shoes 132 disposed at longitudinal ends 153 of the base 102. In this embodiment, the bracket 116 includes a third bracket portion 154. The third bracket portion 154 is configured adjacent to and extends angularly away from the second bracket portion 120, and oriented generally transverse to the bracket first portion 118.

Figure 10:
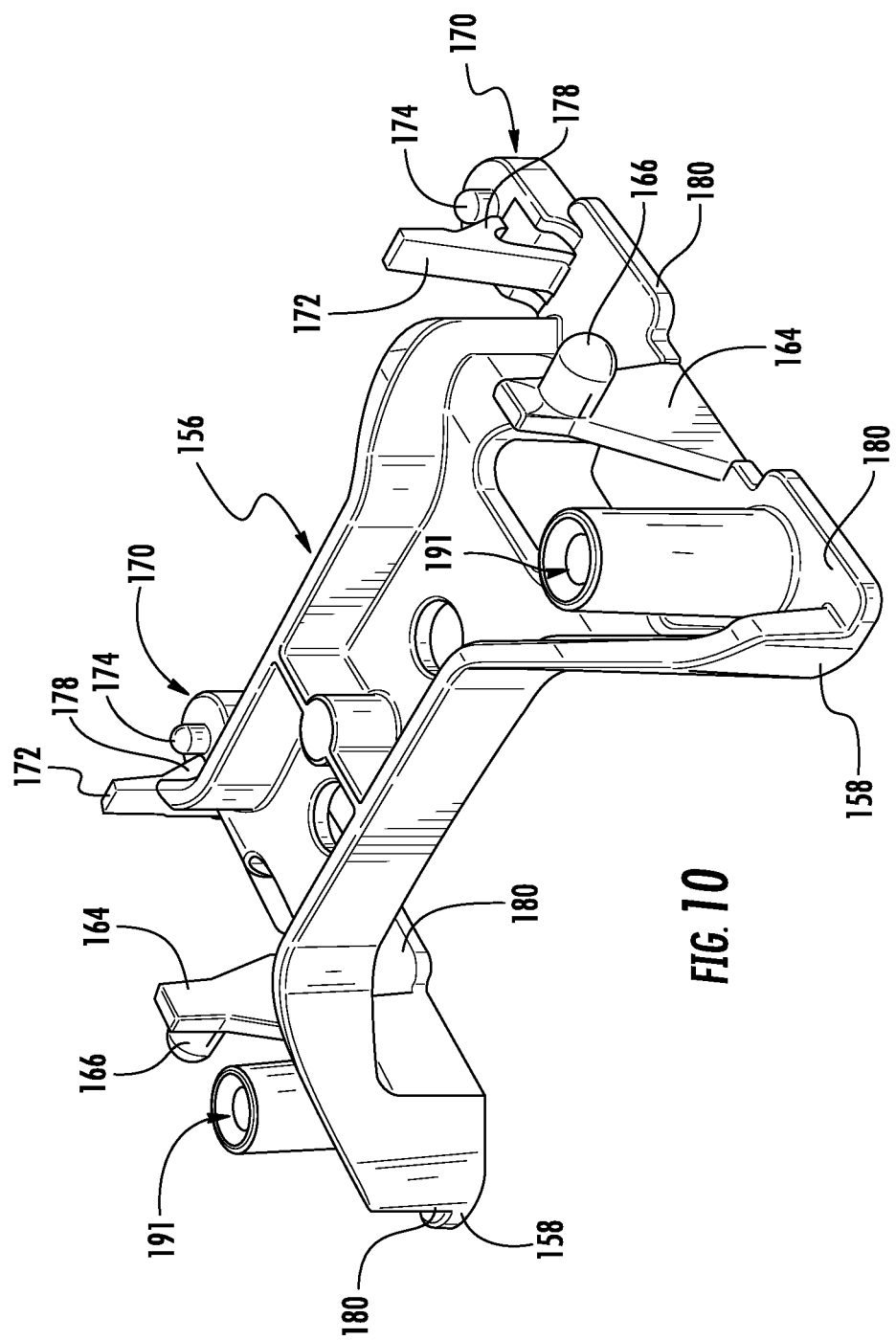
FIG. 10 is a perspective view of the bridge depicted in FIG. 7, all other components of the warning light are omitted for clarity.

As shown in FIGS. 4, 7 and 10, the warning light 100 includes an arch-shaped bridge 156. The bridge 156 extends between laterally opposed pairs of feet 158. As best seen in FIG. 7, in this embodiment the ribs 108 define a center channel 160 laterally opposite the light head shoe retention lips 112. The center channel 160 receives at least one PC board 162 configured to selectively energize the LEDs (not shown).

Referring specifically to FIG. 10, the bridge 156 has at least one snap fit connector 164 that extends axially away from the feet 158. The snap fit connector 164 includes a laterally projecting protrusion 166 at each lateral end. As seen in FIGS. 4 and 7, the protrusion 166 reversibly mates with a longitudinal fixation notch 168 defined on the ribs 108.

The bridge 156 has a PC board retention member 170 including a cantilevered snap 172 which cooperates with a nub 174 to secure the PC board 162 within the center channel 160. A plurality of locator holes 176 are defined on longitudinally opposed ends of the PC board 162 and sized to receive the nub 174. The cantilevered snap 172 has a barb 178, which prevents the locator holes 176 from dislodging from the nub 174 to retain the PC board 162 in a fixed location relative to the base 102.

In one embodiment depicted in FIG. 10, the feet 158 have laterally extending tabs 180 extending inwardly and outwardly. In this embodiment, the base 102 defines a pair of tracks 181 defined intermediate and running longitudinally parallel with the ribs 108 (FIG. 7). The tracks 181 are configured to receive the laterally extending tabs 180 and secure the bridge 156 to the base 102.

Referring to FIGS. 8, and 11-14, a generally light transmissive dome 182 is operatively connectable to the base 102 to define an enclosure. In one embodiment, the dome 182 has a main body portion 184 oriented generally parallel to the base 102. The main body portion 184 defines a longitudinally extending dome channel 186 which extends between longitudinally opposed outer and inner ends 188 and 190, respectively (FIG. 11) on top of the warning light. In one embodiment, the dome channel 186 spans a majority of the lateral width of the dome 182.

A panel 187 is received in the dome channel 186. In one embodiment, the panel 187 is opaque, and obscures views of the internal components of the warning light. The panel 187 may also act as a sunshade, to prevent radiant energy from the sun's rays from heating up the interior of the light bar. As disclosed, the panel 187 is secured to the dome 182 by a plurality of fasteners 189 extending through the dome to engage receptacles on the bridges 191 (FIG. 10). The panel 187 is extruded aluminum, though a plurality of other suitable materials may be used.

Figure 8:
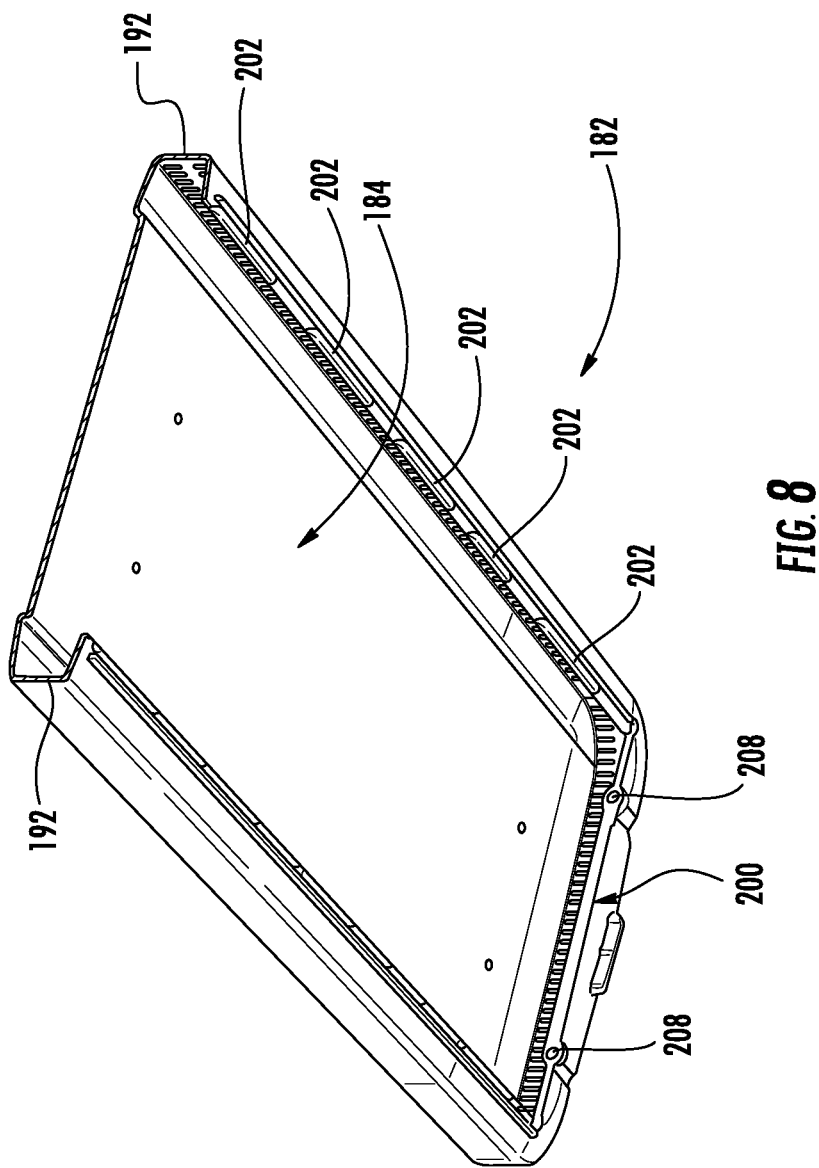
FIG. 8 shows a perspective view of the underside of the light transmissive dome.
Figure 11:
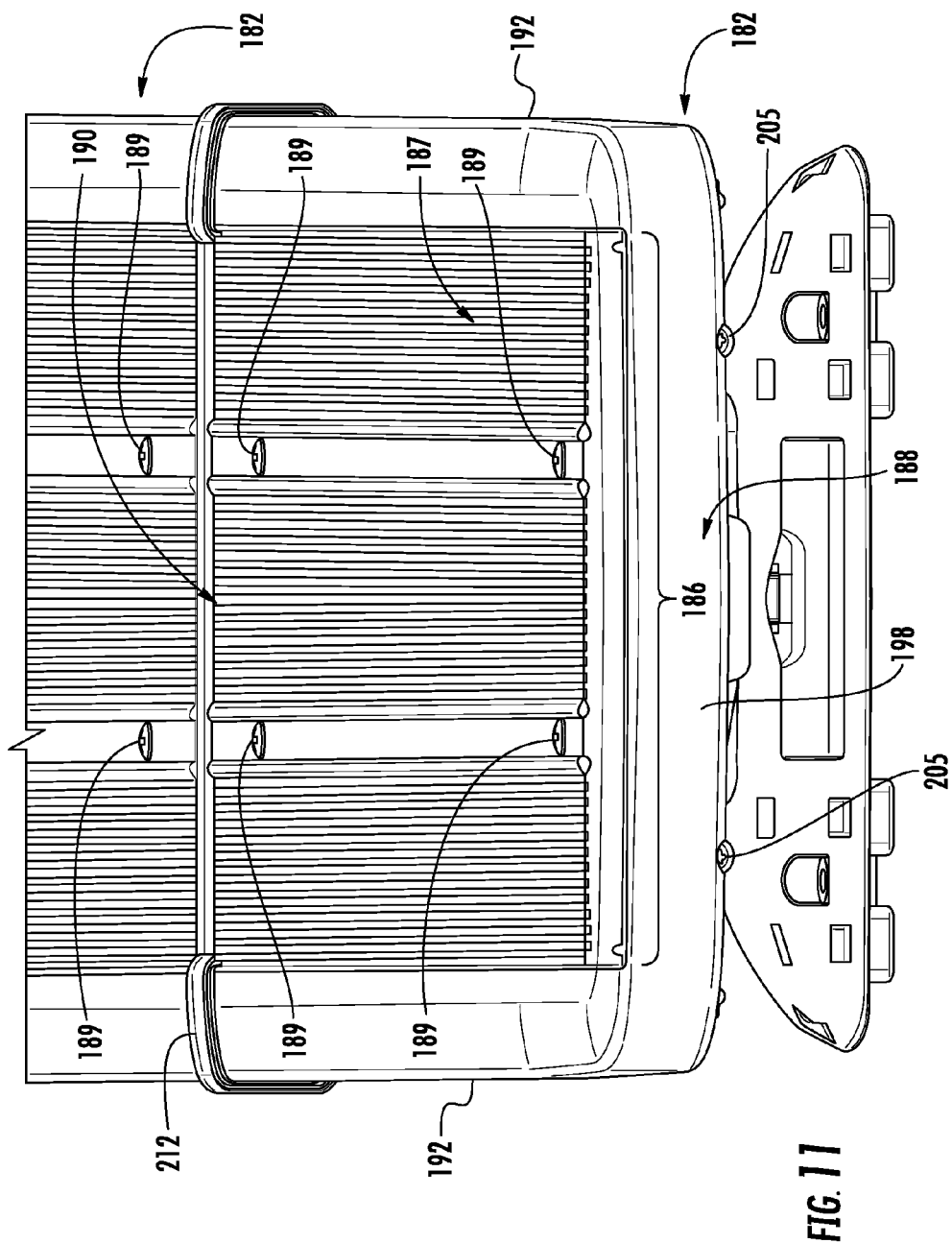
FIG. 11 shows a side view, partly in perspective, of one embodiment of an emergency warning light, the warning light mount depicted in FIG. 4 is also included.
Figure 12:
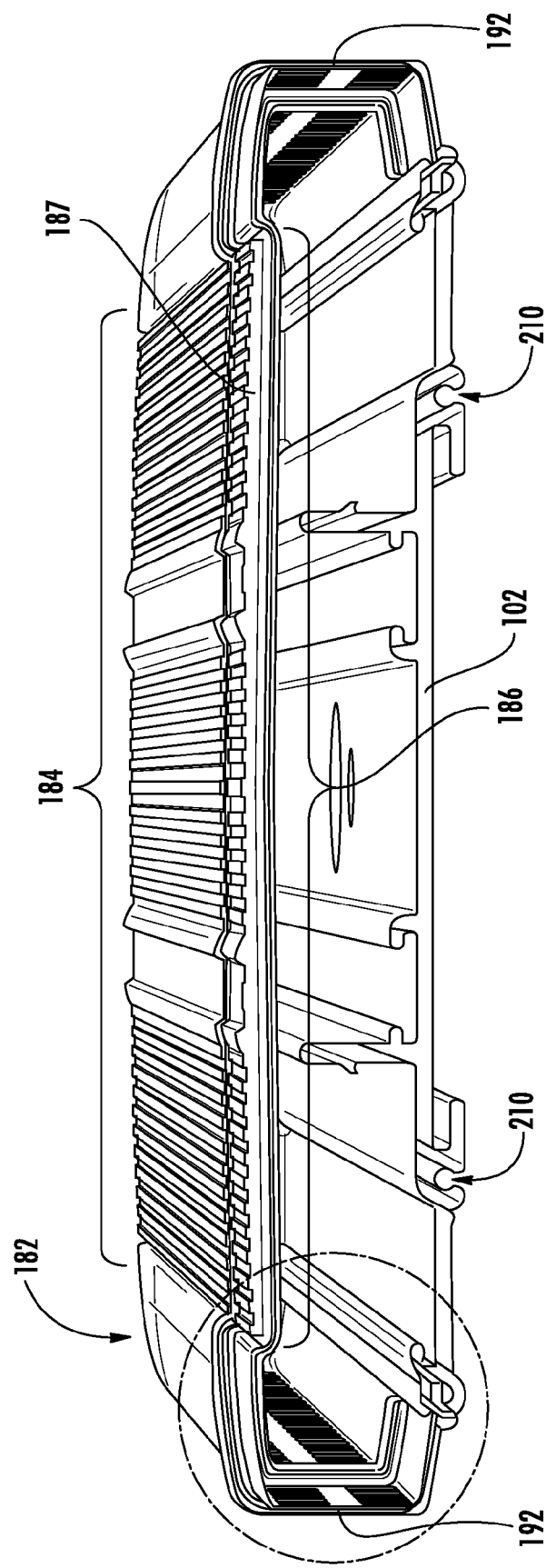
FIG. 12 shows a cross-sectional view of the emergency warning light of FIG. 11, the plurality of LED assemblies, mounting and control circuits have been omitted for clarity.
Figure 13:
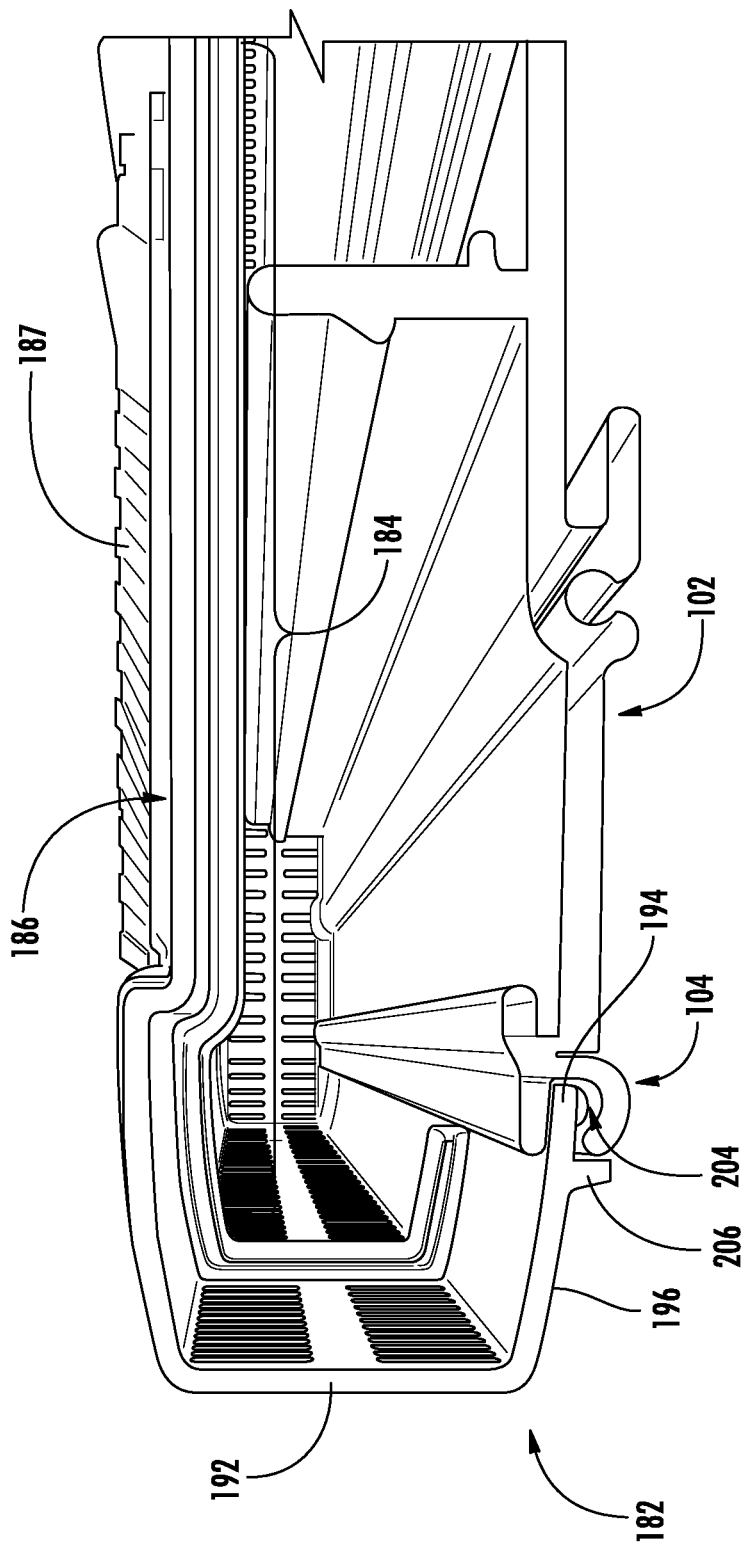
FIG. 13 is a cross-sectional view of one embodiment of the warning light with particular emphasis on the interface between one of the sidewalls and the longitudinal edge of the base, the plurality of LED assemblies, mounting and control circuits have been omitted for clarity.

As best seen in FIGS. 11-13, sidewalls 192 extend the length of the dome 182, between the outer and inner ends of the dome 188 and 190. The sidewalls 192 are contiguous with and extend generally perpendicular from the main body 184, and terminate in a bottom edge 194. As shown in FIGS. 8, 12 and 13, a bottom wall portion 196 projects generally perpendicularly inwardly from the sidewall 192. In this embodiment, the bottom edge 194 is defined at the laterally inward most portion of the bottom wall 196.

In an embodiment of the dome 182 depicted in FIGS. 8 and 11, an end wall 198 located at the first terminal end 188 projects generally perpendicularly away from the main body portion 184. The end wall 198 terminates in a bottom edge 200 which includes fastener apertures 208. The end wall 198 is oriented generally transverse to the sidewalls 192, and the end wall 198 and end wall bottom edge 200 are contiguous with the sidewalls 192 and sidewall bottom edge 196, respectively.

The dome 182 is configured to reversibly mate with the longitudinally extending base 102. In one embodiment best seen in FIGS. 12 and 13, the longitudinal edge 104 of the base 102 defines a longitudinally extending dome-securing channel 204, which runs the length of the base 102. The sidewall bottom edges 194 are configured such that the dome-securing channel 204 receives the sidewall bottom edges 194, securing the dome 182 to the base 102. To secure the dome 182 to the base 102, the sidewall bottom edges 194 at the inner end 190 are first inserted into the dome-securing channel 204. Once the sidewall bottom edges 194 are introduced into the dome-securing channel 204, the dome 182 slides longitudinally on the base 102 until the end wall bottom edge 200 abuts one of the longitudinal ends 153 of the base 102.

In one embodiment shown in FIG. 8, the sidewall bottom edge 194 has an interrupted rail 202, which projects away from the sidewall bottom edge 194. The rail 202 is sized to fit in the dome-securing channel 204 and ensures a secure connection between the dome 182 and the base 102 along the edges 104. The rail 202 is configured to reduce friction between the rail 202 and the dome-securing channel 204 during installation of the dome 182.

As shown in FIG. 13, a lip 206 which projects downwardly away from the sidewall bottom edge 194 adjacent the rail 202 may also be provided. The lip 206 further ensures that the elements do not penetrate the interior of the warning light 100. The lip 206 extends along the front and rear edges of the light bar 100 to direct moisture away from the channel 204.

As best seen in FIGS. 8 and 11, a plurality of fasteners 205 are utilized to ensure a secure connection between the dome 182 and the base 102. As best seen in FIG. 8, the end wall bottom edge 200 defines a plurality of fastener holes 208. The fastener holes 208 are defined on the end wall bottom edge 200 such that they align with fastener receptacles 210 defined on the base 102 (FIG. 12).

As shown in FIGS. 4, 7 and 10, the bridges 156 are configured to cooperate with fasteners 189 to secure the dome 182 and the panel 187 to the base. As best seen in FIG. 10, a plurality of fastener receptacles 191 project axially from the feet 158 of the arch shaped bridge 156. The receptacles 191 are sized to receive the fasteners 189 and hold the main body portion 184 and the panel 187 against the base 102. The receptacles 191 and fasteners 189 work in concert with the dome 182, panel 187, and base 102 to maintain the original shape of the warning light 100, despite aerodynamic forces that act on warning lights when vehicles travel at high speeds.

Figure 14:
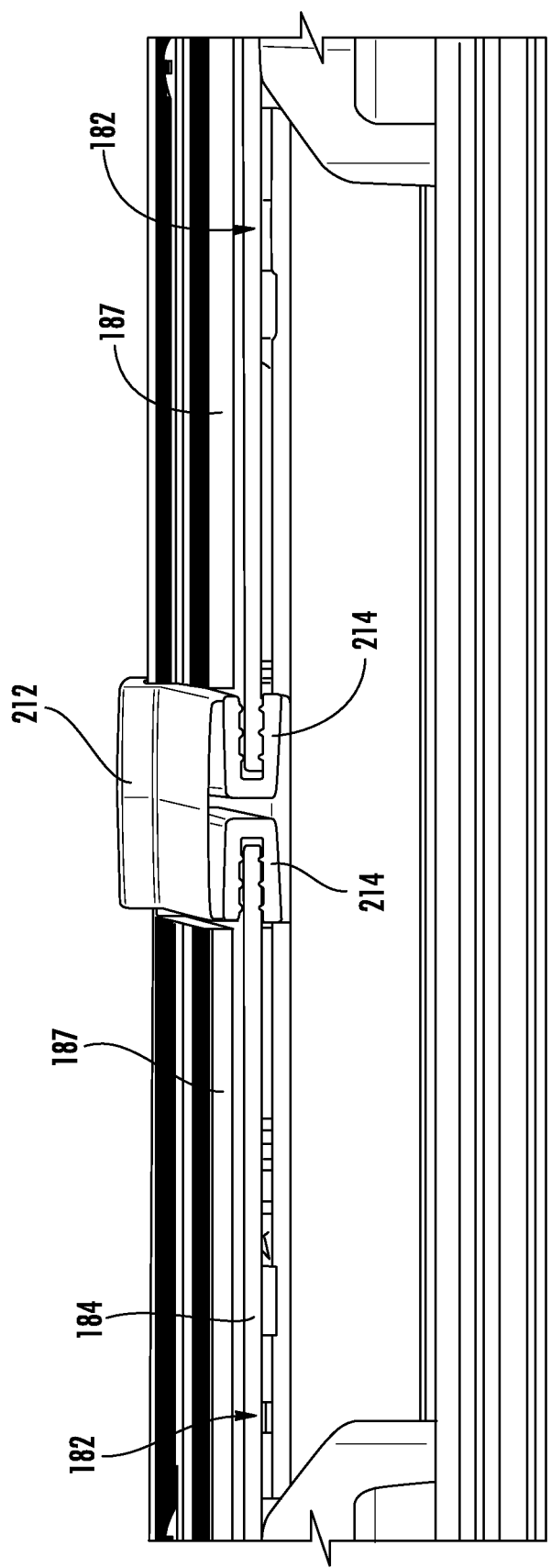
FIG. 14 is a cross-sectional view of one embodiment of the warning light with particular emphasis on the interface between the inner edge of the dome, the dome coupler and the wipe seal, the plurality of LED assemblies, mounting and control circuits have been omitted for clarity.

As shown in FIGS. 11 and 14, the warning light 100 has two generally light transmissive domes 182. The domes 182 are installed on the base 102 such that the inner longitudinal ends 190 of the dome are oriented toward one another. The inner longitudinal ends 190 of the domes 182 are received in a dome coupler 212 when the longitudinal fasteners are secured to the dome securing pockets 210.

The dome coupler 212 has the same sectional configuration as the inner ends 190 of the dome 182. As seen in FIG. 14, dome coupler 212 defines a general I-beam configuration when viewed in longitudinal section. The dome coupler 212 includes a wipe seal 214 which is configured to receive the inner ends 190 of the domes 182. The wipe seal 214 ensures a secure, weather-resistant connection between the dome coupler 212 and the inner ends 190 of the domes 182.

In this embodiment, the domes 182 and the dome coupler 212 are configured to provide a secure, weather-resistant connection with the base 102, even if the length of the base 102 varies. The dome coupler 212 and wipe seal 214 ensure a weather-tight seal is created with the inner ends 190 of the domes 182, even if the base 102 is longer than intended.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A warning light for attachment to a vehicle comprising:
   a thermally conductive longitudinally extending base having a pair of generally parallel longitudinal edges and a pair of laterally disposed ends;
   at least one light transmissive dome having a main body portion oriented generally parallel to said base, longitudinally opposed inner and outer ends, sidewalls contiguous with and extending generally perpendicularly from said generally planar main body portion terminating in a bottom edge, and a bottom wall projecting laterally inwardly from and generally perpendicular to said sidewalls at an end opposite said dome main body portion, wherein said sidewalls extend longitudinally from said inner end to said outer end and laterally along the length of said outer end and said sidewall bottom edges have an interrupted rail projecting away from said bottom wall;
   wherein said longitudinal edges define a longitudinally extending dome-securing channel configured to receive said bottom edge of said sidewalls such that said light transmissive dome is longitudinally slideable along said base between said inner and outer ends, said interrupted rail is configured to reduce friction between said interrupted rail and said longitudinally extending dome-securing channel, and longitudinally sliding said dome along said base until said bottom edge of said end wall is configured adjacent one of said longitudinally opposed ends of said base defines an interior cavity;
   a plurality of LED warning light assemblies installed in said interior cavity of the warning light;
   a plurality of mounting assemblies for fixing said LED warning light assemblies in the interior cavity of the warning light; and
   a plurality of control circuits for selectively energizing the LED warning light assemblies.

2. The warning light of claim 1, wherein said base defines a plurality of fastener receptacles and said dome defines a plurality of fastener holes, said fastener receptacles and said fastener holes are configured to cooperatively engage a fastener, and wherein affixing said fasteners to said fastener receptacles secures said dome to said base along said outer end.

3. The warning light of claim 1, wherein said main body portion defines a shallow longitudinally extending dome channel to receive an extending panel.

4. The warning light of claim 1, wherein at least two light transmissive domes are slideable along said base, said inner ends are oriented towards one another, and wherein said inner ends are received in a dome coupler attached to said longitudinal base edges, and wherein said base and domes define said interior cavity.

5. The warning light of claim 1, wherein said base has a pair of longitudinally extending ribs spaced laterally inwardly of said longitudinal edges and projecting generally perpendicularly from said base defining a center channel sized to receive at least one control PC board and a plurality of arch-shaped bridges, each of said bridges having laterally opposed pairs of feet, a snap fit connector extending away from said bridges configured to reversibly mate with a longitudinal fixation notch defined on at least one of said ribs, a PC board retention member disposed on said bridges comprising a snap working cooperatively with a nub configured to engage one of a plurality of locator holes defined on longitudinally opposed ends of said control PC board to secure said control PC board within said center channel intermediate said bridges.

6. The warning light of claim 1, wherein said plurality of light head mounting assemblies each comprises a bracket constructed of thermally conductive material having a generally planar bracket first portion and a generally planar bracket second portion oriented generally perpendicular to said bracket first portion, and a light head retention shoe having a sole configured to maintain said bracket first portion in thermally conductive contact with said base, and a brace having a web and opposed sidewalls projecting generally perpendicularly from said main body, wherein said shoes are operatively retained intermediate one of said ribs and one of said longitudinal edges, and wherein said LED warning light assemblies are mounted to said bracket second portion.

7. The warning light of claim 6, wherein said base defines a pair of longitudinally extending light head retention pockets adjacent to and oriented laterally away from said longitudinal edges and each of said ribs terminates in a distal ridge, said ribs have a retention lip projecting laterally toward said retention pocket at a point intermediate said base and said distal ridge and defining a retention channel oriented toward said base; and each of said shoes has a rib engaging portion laterally opposite said sole having a plurality of fingers configured to engage said distal ridge and a flexible retention member configured to reversibly engage said retention channel, said sole of each shoe configured to engage said retention pocket of said base, and said brace sidewalls extend angularly between said rib engaging portion and said sole, thereby forming a rigid structure.

8. The warning light of claim 1, wherein said plurality of brackets and light head retention shoes are juxtaposed along an entire length of each longitudinal edge such that said plurality of LEDs provide an unbroken pattern of light along said entire length.

9. The warning light of claim 8, wherein light heads configured at longitudinal ends of said base have a bracket third portion adjacent to and extending angularly away from said bracket second portion and oriented generally transverse to said bracket first portion.

10. The warning light of claim 7, wherein the flexible retention member is a cantilevered snap fit connector.

11. The warning light of claim 10, wherein the cantilevered snap fit connector is a u-shaped cantilevered snap fit connector.

12. The warning light of claim 1, further comprising a longitudinally extending lip adjacent said interrupted rail and projecting away from said bottom wall, said longitudinally extending lip is configured to ensure that outside elements do not penetrate said interior cavity.

13. A warning light comprising:
a thermally conductive base having a longitudinal edge, a longitudinally extending pocket adjacent to and oriented away from said longitudinal edge, and a longitudinally extending rib spaced laterally inwardly of said pocket and projecting generally perpendicular from said base terminating in a distal ridge;
a bracket having a generally planar first bracket portion in contact with said base, a generally planar second bracket portion oriented generally perpendicular to said first bracket portion, and a slot aligned with said pocket; and
a light head retention shoe having a sole with a leading edge, a toe adjacent to and oriented away from said leading edge configured to pass through said slot to engage said pocket, and a heel located laterally opposite said leading edge configured to engage said rib to maintain said bracket first portion in thermally conductive contact with said base and secure said shoe and bracket in a selected longitudinal position relative to said base.

14. The warning light of claim 13, further comprising a plurality of LED warning light assemblies mounted to said bracket second portion in thermal communication.

15. The warning light of claim 13, wherein said rib has a retention lip projecting laterally toward said retention pocket at a point intermediate said base and said distal ridge, said retention lip defines a retention channel oriented toward said base, and said heel having a plurality of fingers configured to engage said retention channel.

16. The warning light of claim 15, wherein said fingers are cantilevered snap fit connectors.

17. The warning light of claim 16, wherein the cantilevered snap fit connector is a u-shaped cantilevered snap fit connector.

18. The warning light of claim 13, further comprising a brace extending between said sole and said rib engaging portion, a web extending in the longitudinal direction from said brace, and a plurality of opposed sidewalls projecting generally perpendicularly from said web.

* * * * *